(12) United States Patent
Löw et al.

(10) Patent No.: US 6,497,335 B2
(45) Date of Patent: *Dec. 24, 2002

(54) FILLER NECK FOR A FUEL TANK OF A MOTOR VEHICLE

(75) Inventors: Peter Andreas Löw, Rossdorf (DE); Christian Kochsmeier, Dortmund (DE); Thomas Zapp, Dortmund (DE); Wolfgang Pfahl, Hofheim (DE)

(73) Assignee: Mannesmann VDO AG, Frankfurt (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 6 days.

(21) Appl. No.: 09/430,648

(22) Filed: Oct. 29, 1999

(65) Prior Publication Data

US 2001/0042750 A1 Nov. 22, 2001

(30) Foreign Application Priority Data

Nov. 5, 1998 (DE) .......................................... 198 50 904

(51) Int. Cl.[7] .................................................. B65B 3/00

(52) U.S. Cl. ..................... 220/86.2; 220/86.1; 220/563; 220/564

(58) Field of Search ............................... 220/86.1, 86.2, 220/563, 564, 203.02, 203.28, 203.29, 4.24

(56) References Cited

U.S. PATENT DOCUMENTS

| 2,104,461 | A | * | 1/1938 | Holm ........................ 220/86.2 |
|---|---|---|---|---|
| 2,466,075 | A | * | 4/1949 | Bentley et al. ............. 220/86.2 |
| 2,548,734 | A | * | 4/1951 | Mathey ..................... 220/86.2 |
| 3,129,014 | A | | 4/1964 | Hutchison |
| 3,187,936 | A | * | 6/1965 | Downing .................. 220/86.2 |
| 4,122,968 | A | * | 10/1978 | Germain .................... 220/86.2 |
| 4,630,749 | A | * | 12/1986 | Armstrong et al. ........ 220/86.2 |
| 4,795,048 | A | * | 1/1989 | Trussardi .................. 220/4.21 |
| 4,801,343 | A | * | 1/1989 | Tamba et al. ............... 156/69 |
| 4,816,045 | A | * | 3/1989 | Szlaga ...................... 220/86.2 |
| 4,934,417 | A | | 6/1990 | Bucci |
| 5,027,868 | A | * | 7/1991 | Morris et al. ............. 220/86.2 |
| 5,275,213 | A | * | 1/1994 | Perkins ..................... 220/86.1 |
| 5,375,633 | A | | 12/1994 | Bucci |
| 5,538,039 | A | * | 7/1996 | Harde et al. ............... 220/86.2 |
| 5,740,842 | A | * | 4/1998 | Maier et al. ............... 220/86.2 |

FOREIGN PATENT DOCUMENTS

| DE | 19605922 | 8/1996 |
|---|---|---|
| DE | 19627742 | 1/1998 |
| EP | 0751024 | 1/1997 |

* cited by examiner

Primary Examiner—Paul T. Sewell
Assistant Examiner—Troy Arnold
(74) Attorney, Agent, or Firm—Martin A. Farber

(57) ABSTRACT

A filler neck for the introduction of fuel into a fuel tank of a motor vehicle is constructed of at least two interconnected injection-molded half shells, each half shell having outwardly curved regions which form a filler pipe and vent lines. Also, receptacles for valves and filters are integrally formed in the outwardly curved regions.

14 Claims, 2 Drawing Sheets

FILLER NECK FOR A FUEL TANK OF A MOTOR VEHICLE

FIELD AND BACKGROUND OF THE INVENTION

The subject of the invention is a filler neck for a fuel tank of a motor vehicle, with vent lines and valves arranged in addition to the filler pipe.

Filler necks for fuel tanks of motor vehicles are generally known. In addition to the actual filler pipe for introducing fuel into the fuel tank, current filler necks have additional lines and compensating reservoirs for venting the fuel tank while the motor vehicle is being refueled and operated. Furthermore, filler necks often have valves, such as, for example, roll-over valves, switching valves and safety valves.

It is known to produce filler pipes for fuel tanks by the blow molding method and subsequently to mount the vent lines and the valves, together with the filler pipe, on the filler neck. For this purpose, the vent lines have to be laid in place and connected to the filler pipe. The necessary valves likewise have to be connected to the corresponding lines. A filler neck of this type possesses a multiplicity of individual parts and connections and therefore requires a high outlay in terms of assembly. Moreover, the high fuel permeation due to the connections on the filler neck is also particularly disadvantageous.

It is also known to produce vent lines in one piece with the filler pipe by the blow molding method, the vent lines being connected only on the circumference to the filler pipe and separately to valves or to the fuel tank. In this design, too, filler necks still have high permeation values. Finally, because of poor access, the valves are also complicated to mount when they are subsequently built into the blow-molded filler pipe.

Improved mounting is made possible by a filler pipe which is produced by the injection molding of two half shells. In this design, a valve can be mounted into the half shells before these are welded together.

SUMMARY OF THE INVENTION

The object on which the invention is based is to provide an easily mountable filler neck which has low permeation values.

The filler neck according to the invention comprises of at least two interconnected injection-molded half shells, each half shell possessing a plurality of outwardly curved regions. In the connected state, these outwardly curved regions produce individual chambers of the filler neck. These chambers form the filler pipe, the operational vent line, the tank vent line or further lines of the filler neck. Furthermore, at least one chamber, preferably the chamber forming the filler pipe is designed for connection to another component, in particular the fuel tank. Moreover, receptacles are integrally formed in the outwardly curved regions of the half shells, in order to arrange structural elements in the filler neck.

The essential advantage of this filler neck is that all the lines, valves and other structural elements are now arranged in the half shells. The filler neck therefore does not have any other connection points, apart from the connection to the fuel tank, so that very low permeation values are achieved. Also, this filler neck makes very simple mounting possible, since the structural elements, for example roll-over valve, backwash valve, vent valve, can be mounted in the individual half shells prior to assembly.

Advantageously, the half shells of the filler neck are welded to one another. However, all other connections leading to a permanent and leaktight composite structure of the half shells may also be envisaged. In this case, the filler neck according to the invention can be produced particularly easily if the half shells are connected to one another on their end faces. The half shells can be connected particularly simply if all the end faces lie in one plane.

In another development, not all the end faces lie in one plane. It may be advantageous to provide one or more end faces of a half shell so as to be elevated out of the plane of the other end faces, so that these elevated end faces, when being connected to the other half shell, reach into an outwardly curved region of the other half shell. What is achieved thereby is that, when the half shells are welded together, this elevated end face subdivides the outwardly curved region of the other half shell into two chambers.

Furthermore, it may be advantageous, depending on the geometry of the filler neck, if the filler neck is formed from three or more half shells. As a result, despite the filler neck having a complicated shape, the half shells can be produced by means of relatively simple molding dies.

It is advantageous if the half shells have integrally formed on them connecting and catching elements. By means of these, the structural elements can be fixed in the half shells particularly simply. There is therefore no need to have additional fastening means for the structural elements.

In an advantageous development, the filler neck is particularly small if the vent lines are not formed as chambers in the half shells, but are produced in them by the gas internal pressure method (GID). For this purpose, when the half shells are being produced, a gas is injected in one region of the plasticized plastic and, by means of its pressure, inflates the plastic material, thus providing a cavity which forms the subsequent line. These GID lines may, in turn, open again into a chamber. The vent lines can thus be arranged particularly simply, for example, in the wall of the chamber forming the filler pipe.

In a further advantageous development, these GID lines, on the one hand, open into the filler pipe, whilst, at their other end, they open into further chambers, in which, for example, valves are arranged. The advantage of this design is that the vent lines are led out of the fuel tank through the lower region of the filler pipe and are then connected to the corresponding GID lines. The filler neck according to the invention therefore requires only one point of connection to the fuel tank, thus likewise contributing to a marked reduction in permeation.

In a further advantageous development, a filter for the gases to be discharged through the vent lines is integrated into the filler neck. For this purpose, the filler neck possesses a further line leading from the vent lines to a region in which the filter, preferably an activated charcoal filter, is arranged. The filter may, in this case, be arranged at any desired point on the filler neck. The purified gases are conducted to the atmosphere via a shutoff valve which is likewise arranged in the filler neck and which is provided for leak diagnosis in order to check the leak-tightness of the tank.

In another development, a chamber in the half shells forms the filter housing, so that only the filter material has to be arranged in this chamber. The filter can consequently be adapted more closely to the existing geometry of the motor vehicle, and no space is required for a separate arrangement of the filter. The line to the filter is also dispensed with. Arranging the filter in the filler neck likewise contributes to reducing the permeation.

It is also advantageous to arrange in the half shells, instead of the receptacles for the valves, parts of the valves, for example the housing and valve seat, in that these parts are integrally injection-molded onto the half shells.

BRIEF DESCRIPTION OF THE DRAWINGS

The invention is explained in more detail with reference to an exemplary embodiment. Of the accompanying figures of the drawings.

DETAILED DESCRIPTION OF THE PREFERRED EMBODIMENT

Figure 1:
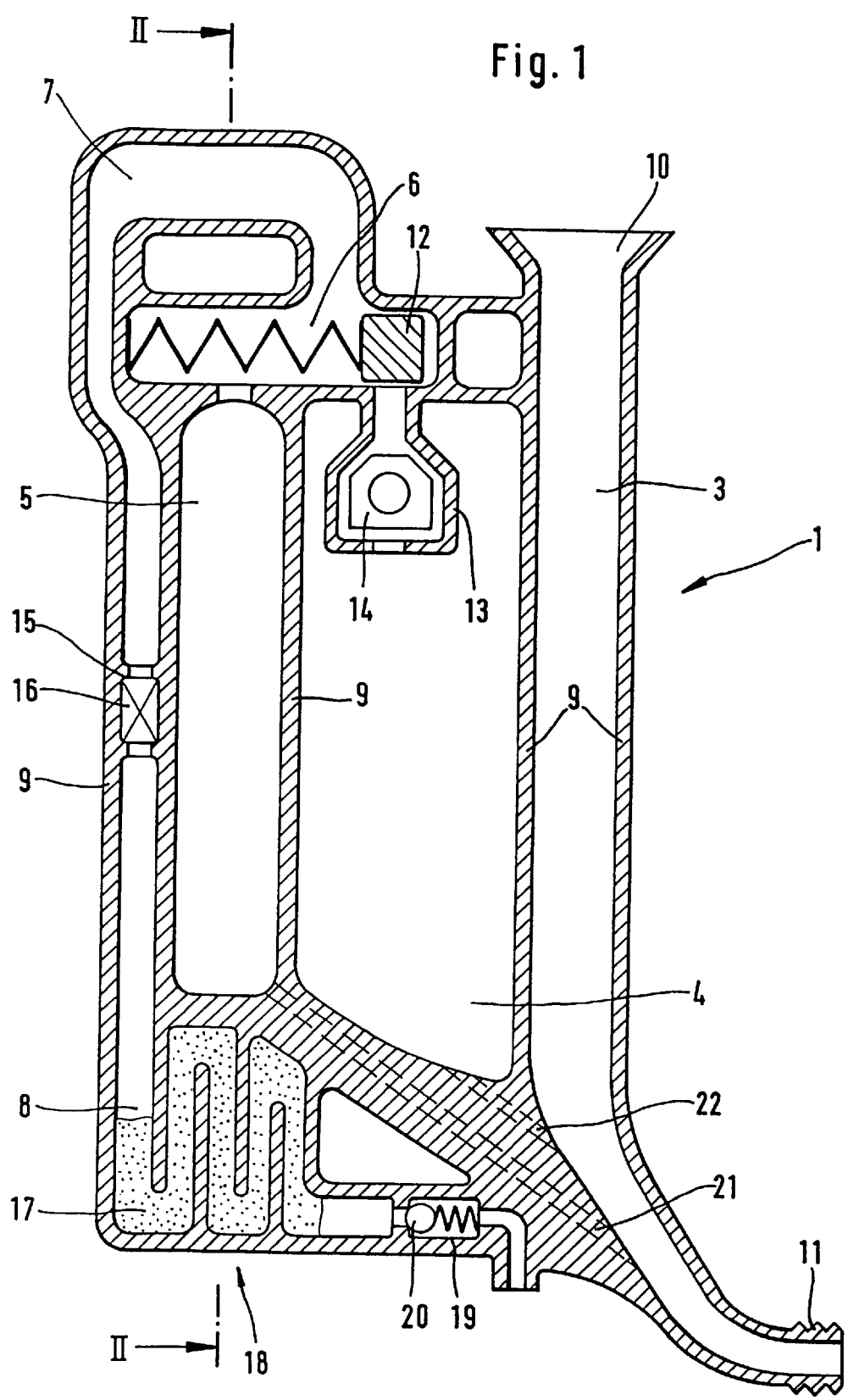
FIG. 1 shows diagrammatically a half section through a filler neck according to the invention.

FIG. 1 shows a filler neck consisting of two half shells. The half shell 1 consists of a plurality of regions 3–8 which are outwardly curved into the drawing plane and are separated from one another by wall portions possessing end faces 9. Welding the two half shells 1, 2 together gives rise, from the region 3 and the corresponding region of the other half shell, to a chamber which forms the filler pipe for introducing fuel into the fuel tank. The filler neck is fastened at one end 10 to the body of the motor vehicle and at the other end 11 to the fuel tank. The region 4 provides operational venting and the region 5 tank venting. Arranged in a further region 6 is a changeover valve 12 which, depending on the operating mode, opens operational venting and closes tank venting, or vice versa. A receptacle 13 for a roll-over valve 14 is integrally formed in the half shell 1 at the upper end of operational venting. A region 7 forms a further line, through which gases are conducted into a lower region 8 of the half shell 1. The region 7 likewise has a receptacle 15 for a protective valve 16 which safeguards the tank against inadmissibly high overpressure or underpressure. The lower region 8 is of meanderlike design and is filled with activated charcoal 17. This region 8 of the filler neck thus forms a filter 18, the lower region 8 at the same time being the filter housing. Forming the region 7 above the end 10 of the filler pipe additionally avoids the situation where fuel can penetrate into the filter 18. Further along, a shutoff valve 20 is arranged in a last receptacle 19 integrally formed on the half shell 1, in order to close off the tank system relative to the atmosphere during leak diagnosis. A GID line 21, 22 opens into each of the lower parts of the regions 4, 5 and is directly connected to the vent lines in the tank. The GID lines 21, 22 are designed, at their end opening into the region 3, in such a way that they can receive vent lines led out of the fuel tank.

Figure 2:
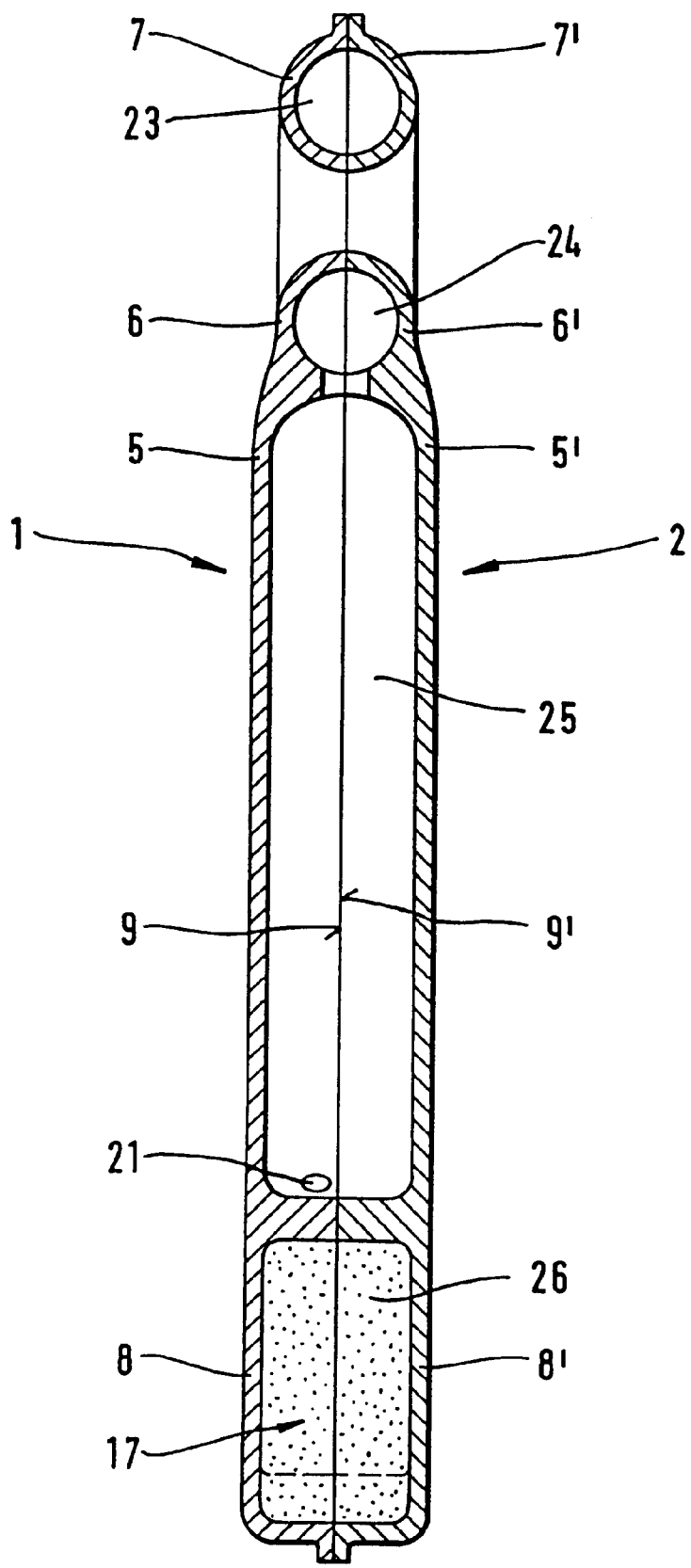
FIG. 2 shows a section through the filler neck along the line II—II.

FIG. 2 shows the filler neck consisting of the half shells 1, 2. The half shells 1, 2 are welded to one another on their end faces 9, 9'. The outwardly curved regions 7, 7' of the half shells 1, 2 form a chamber 23 which conducts the gases out of the fuel tank to the filter. The outwardly curved regions 6, 6' form the chamber 24, in which the changeover valve 12 is arranged. Said chamber is followed by a chamber 25, formed from the regions 5, 5', for tank venting. The GID line 21 opens into the region 5 of the half shell 1 in the lower part of the chamber 25. Separated by a wall region, a chamber 26 filled with filter material 17 is formed underneath from the regions 8, 8'.

Irrespective of this special development, the invention also embraces all other forms of filler necks which are implemented, depending on the conditions of space in a motor vehicle for a filler neck of this type.

We claim:

1. A filler neck for a fuel tank of a motor vehicle, comprising a plurality of components including a filler pipe, a vent line and at least one valve, wherein the components are arranged along a common plane, and the components of the filler neck are formed from at least two interconnected injection-molded half shells, wherein the half shells have outwardly curved regions which form plural individual chambers and at least one receptacle for housing said at least one valve when the half shells are in the assembled state, said at least one receptacle being located in said vent line apart from said filler pipe, wherein at least one of said chambers is intended for connection to the fuel tank, and wherein said at least one receptacle is integrally formed with said chambers in the half shells, the half shells having end faces wherein end faces of half shells on one side of the common plane face corresponding end faces of half shells on the opposite side of the common plane.

2. The filler neck as claimed in claim 1, wherein the half shells (1, 2) are connected to one another on their end faces (9).

3. The filler neck as claimed in claim 2, wherein the end faces (9) are arranged in one plane.

4. The filler neck as claimed in claim 2, wherein the end faces (9) are arranged in a plurality of planes.

5. The filler neck as claimed in claim 1, wherein the half shells (1, 2) are connected to one another in such a way that one end face (9) is connected to one of the outwardly curved regions (3–8).

6. The filler neck as claimed in claim 1, wherein the filler neck possesses a welded joint for connecting the half shells (1, 2).

7. The filler neck as claimed in claim 1, wherein catching and connecting elements, preferably snap elements, for connecting the half shells (1, 2) are integrally formed on these.

8. The filler neck as claimed in claim 1, wherein the end faces (9) of the half shells (1, 2) possess recesses, via which individual chambers (23–25) are connected to one another.

9. The filler neck as claimed in claim 1, wherein lines (21, 22) which are produced by the gas internal pressure method are arranged in the half shells (1, 2).

10. The filler neck as claimed in claim 1, wherein lines (21, 22) which are produced by the gas internal pressure method open into the chambers (23–25).

11. The filler neck as claimed in claim 1, wherein the lines (21, 22) produced by the gas internal pressure method open into the chamber forming the filler pipe.

12. The filler neck as claimed in claim 1, wherein the chambers (23–25) or parts of these are designed as housing for structural elements (14, 16, 18, 20).

13. The filler neck as claimed in claim 12, wherein one chamber (25) is the housing for a filter (18).

14. The filler neck as claimed in claim 13, wherein the filter (18) is an activated charcoal filter.

* * * * *